(12) United States Patent
Konstantin et al.

(10) Patent No.: US 6,186,341 B1
(45) Date of Patent: Feb. 13, 2001

(54) INTEGRITY TESTABLE FILTRATION UNIT USING SUPPORTED HYDROPHILIC POROUS MEMBRANES

(75) Inventors: Peter Konstantin, Neunkirchen; Oscar-Werner Reif, Hannover; Jürgen Rupp; Peter Soelkner, both of Göttingen, all of (DE)

(73) Assignee: Sartorius AG, Gottingen (DE)

( * ) Notice: Under 35 U.S.C. 154(b), the term of this patent shall be extended for 0 days.

(21) Appl. No.: 09/083,562

(22) Filed: May 22, 1998

(30) Foreign Application Priority Data

Nov. 25, 1995 (DE) ............................... 195 43 955

(51) Int. Cl.[7] .................................................. B01D 29/00
(52) U.S. Cl. ........................ 210/488; 210/490; 210/493.2
(58) Field of Search ................. 210/321.78, 321.79, 210/321.8, 321.81, 321.82, 321.83, 321.84, 321.85, 321.86, 321.87, 321.88, 321.89, 490, 321.9, 488, 493.2

(56) References Cited

U.S. PATENT DOCUMENTS

| | | |
|---|---|---|
| 4,579,698 | 4/1986 | Meyering et al. . |
| 4,765,915 * | 8/1988 | Diehl . |
| 4,906,371 | 3/1990 | Miller . |
| 4,929,354 | 5/1990 | Meyering et al. . |
| 4,969,997 | 11/1990 | Klüver et al. . |
| 5,340,480 * | 8/1994 | Kawata et al. . |

FOREIGN PATENT DOCUMENTS

| | | |
|---|---|---|
| 4234816 * | 10/1993 | (DE) . |
| 4339810 * | 12/1994 | (DE) . |
| 0036315 * | 9/1981 | (EP) . |
| 0096306 * | 12/1983 | (EP) . |
| 0 576 343 A2 | 12/1993 | (EP) . |
| 01034403 * | 2/1989 | (JP) . |

* cited by examiner

Primary Examiner—W. L. Walker
Assistant Examiner—Terry K. Cecil
(74) Attorney, Agent, or Firm—Chernoff, Vilhuaer, McClung & Stenzel, LLP

(57) ABSTRACT

The hydrophilicity of porous separation membranes is maintained by bonding the membranes to thermoplastic fiber substrates at least on their peripheries before the membrane peripheries are sealed in a thermoplastic resin. The membranes are capable of being integrity tested.

15 Claims, 4 Drawing Sheets

3  2  1  4

3  2  1  4

3  2  1  4

3  2 1  4

3  2  1 4

3   2 1 4

1 2 6

3 2 4

3 1 2 6 4

1 2 6 4

3 2 6 4

INTEGRITY TESTABLE FILTRATION UNIT USING SUPPORTED HYDROPHILIC POROUS MEMBRANES

BACKGROUND OF THE INVENTION

A filtration unit having hydrophilic, porous polymeric membranes and which is capable of being tested for integrity finds application in areas with high demands for filtration reliability, i.e., in the pharmaceutical and food industries, in medicine, in laboratory work and in biotechnology. Porous membranes are rendered hydrophilic either by virtue of their structural morphology or by the addition of a hydrophilic wetting agent or other hydrophilic additive. Such filters are normally used in the form of modules or cartridges.

Filtration reliability is understood in the art to mean that the filtration unit must show sufficiently high mechanical and chemical stability to last a reasonable period of time and must be capable of being tested for integrity. Filtration capacity relates to the volume flow of filtrate per unit of time, which is typically expressed as flux.

A frequently employed integrity test for filtration units having hydrophilic, porous membranes is that constituting fluid impingement on one side of the membrane, the pores of which are filled with a fluid such as water or by a gas such as air under a test pressure. From the measurement of the duration of the pressure loss at the membrane side pressurized with test gas, or by the quantity of the test gas which penetrates through the membrane, conclusions can be drawn as to the integrity of the membrane within the filtration unit. Exemplary tests include burst tests, bubble-point tests and diffusion tests. All known integrity tests for hydrophilic membranes require a thorough wetting of both the membrane filtration surface and its peripheral sealed surfaces.

In general, the use of hydrophilic, porous membranes in filtration units is expensive, if one wishes to maintain a relatively small inventory of filtration units that are not integrity testable. A current method of incorporating such membranes into hydrophilic filtration modules comprises potting such membranes at their peripheries in thermoplastic resin end caps or anchoring elements so as to achieve a fluid-tight seal between the membrane and the module at both ends of the module. The chief drawback of this known method is that the heat from the melt of the thermoplastic resin tends to denature the hydrophilic, porous membranes in the area of contact with the membranes and in areas adjacent thereto, often rendering the membranes hydrophobic in those areas. As a consequence, these hydrophobic-rendered peripheral areas can no longer be wetted with water, which in turn causes the integrity test gas to pass without hindrance through the pores in these areas, thereby simulating a failed membrane.

In addition, such hydrophilic membranes tend to be brittle, and so can be only lightly stressed by mechanical loading, and are susceptible to tearing and tend toward progressive fissuring. Thus, in the treatment of these membranes, for instance where cutting, stamping or pleating are concerned, or even in the act of incorporation into a module, defects can be introduced. This already fragile mechanical stability of the membrane may be further impaired by the action of the hot melt of the thermoplastic resin during the potting, often leading to breaks in the membrane, with the result that the filtration modules are no longer testable for integrity. In biological fluid filtration applications, this is unacceptable because of the risk of contaminants bypassing the membrane filter and, for example, entering the blood stream of a patient:.

One way to cure such problems is disclosed in PCT Application No. 96/14913 wherein the resulting peripheral hydrophobic areas are post-treated with a hydrophilic agent. Several suggestions for overcoming the hydrophobic periphery problem are disclosed in European Patent No. 0 096 306. One proposal is to seal the edges of the hydrophilic membrane with non-porous polyester film, which on one side, is provided with a solvent-free polyethylene coating serving as a fusion adhesive. In the same patent, the reduction of the porosity of the hydrophilic membrane along the membrane edges was also proposed by the use of a casting dope which yielded a smaller pore size than that of the main surface of the membrane. A third method was to mechanically compress the membrane along its edges so as to collapse its pores in the compressed areas.

European Patent No. 0 036 315 also discloses a mechanical procedure, whereby the sensitive peripheral area of the hydrophilic membranes is treated by applying an adhesive thereto. The disadvantage of this treatment lies in the unsatisfactory temperature stability of the membrane areas which have been so treated, when they are exposed to a plurality of steam cycles at 134° C. Commonly assigned U.S. Pat. No. 4,969,997 describes a method of imparting fluid impermeability to the edges of porous membranes by forming a film over the surface of the membrane edges, the film formation being accomplished by contacting the membrane edges with a hot gas to liquify the membrane in the edge area, then allowing the same to cool so as to seal the pores and form a film.

German Patent No. 43 39 810 discloses impregnation of the peripheral areas of the membranes with a hydrophilic-rendering agent to thereby saturate the membranes in those areas. The so-treated membranes are subsequently washed and dried. Theoretically, these membranes should possess, in their impregnated areas, at least double the hydrophilicity as the untreated areas. The result of this is that following potting of the membranes, because of the great surplus of hydrophilic agent in the peripheral areas of the membranes, no edge hydrophobic characteristics appear.

All of the above proposed solutions possess at least one of the following disadvantages:

they are technologically expensive in money and time, they introduce foreign agents which may be flushed out during filtration, the active filtration surface is diminished by film deposition or by coating with a non-porous film, thereby reducing flux, and the peripheral areas of the membrane suffer from mechanical injury.

Thus, the purpose of the present invention is to create a hydrophilic membrane filter unit capable of being tested for integrity, which, in the periphery of the membrane, is sealed with the thermoplastic resin-of a module without compromising the hydrophilicity in the peripheral or edge areas of the membrane and which has improved filtration reliability and capacity.

SUMMARY OF THE INVENTION

The foregoing purposes are achieved by bonding the hydrophilic porous membrane to thermoplastic polymer fibers, at least in the membrane's peripheral edge area on at least one side with at least one support substrate.

Rather surprisingly, filtration units produced in accordance with the present invention exhibit relatively little decline in flux, having fluxes of at least 90% of that for filtration units wherein no bonding is provided between the membrane and the support.

DETAILED DESCRIPTION OF PREFERRED EMBODIMENTS

Figure 1:
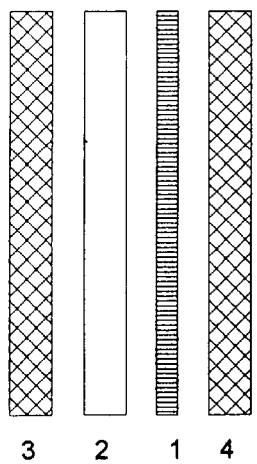
FIG. 1 is a schematic of an assembly of a support sheet with a hydrophilic, porous membrane and a sheet of spacer mats/fabrics to facilitate permeation and enhance flux through the membrane, without physical/chemical bonding before sealing or potting the assembly in an anchoring element such as an end cap of a module.

The fluid-tight sealing or potting of the porous membranes with bonded supports in the anchoring elements of a typical filtration module is carried out in conventional fashion, for instance by means of ultrasonic or infrared melting of a thermoplastic resin such as polypropylene, which is either the material from which the anchoring elements is made or is incorporated into the anchoring element such as an end cap of a filter module. In accordance with the invention, when this is done, the melt of the thermoplastic resin or end cap preferentially impregnates the membrane support in order to form a fluid-tight union with the end cap while at the same time avoids any denaturing of the hydrophilic character of the membrane in its peripheral or edge areas. It has been discovered that this result is achieved only if, prior to the potting in the anchoring element, there is present a physical/chemical bond between the membrane and its support. This observation has been borne out by showing that when, during the potting procedure there is a loose contact between the membrane and the support sheet, for instance when the membrane and the core sheet are simply laid one over the other, then the filter element develops hydrophobicity in the membrane's periphery and is not capable of being tested for integrity.

Preferably, the hydrophilic, porous membrane is bound to a support substrate such as a sheet having thermoplastic polymer fibers. Although not wishing to be bound by any particular theory, it appears that the relatively low melting point of the thermoplastic fibers of the membrane support protect the hydrophilicity of the porous filtering membrane by facilitating heat removal during the solid/liquid phase change that occurs during sealing or potting. In addition, the liquid melt of the porous thermoplastic support substrate appears to coat the pores of the hydrophilic membrane in its peripheral heat-sensitive areas, further protecting the hydrophilicity of the membrane's edge areas during potting. By means of the bonding between the hydrophilic membrane and its support substrate, the liquid melts and flows by osmosis into the membrane or, by means of adhesion forces, covers the membrane and seals the covered areas. Direct adhesion between porous membrane and the support substrate sheet likewise promotes the removal of heat.

The support substrates can also be flame-bonded onto the porous membranes, as taught in the case of the core-clad support mats in German Patent No. C1 42 34 816. The physical/chemical bonding between the support substrate and the membrane can be effected not only by a lamination procedure with conventional equipment, but also by the application of pressure and temperature during subsequent mechanical working of the membrane and its support substrate, for instance, during pleating. Particularly advantageous is the use of bonding by means of a three layer construction, commonly referred to as "sandwich buildup." This is particularly effective when it involves a support substrate sheet which has a porous membrane on one side and a woven web material or other type of mat or fleece bound to the other side. In this manner, not only is the hydrophilic membrane shielded from the development of hydrophobicity, but mechanical stability is noticeably increased and flux is typically reduced by less than 10% in comparison to unreinforced membranes. And, in the case of "spot bonding," achieved through a pleating operation with pressure and a pleating temperature lower than the melting temperature of the support substrate, flux is reduced by less than 2.5% relative to the flux of an unreinforced membrane. Finally, if the porous membrane is only laminated in the edge area with a support substrate, then flux is reduced by less than 2%.

Support substrates may be made of organic polymer-based sheets, mats, webs, netting, fleeces or composites such as sheath-clad/core fleeces, and may be woven or knitted. Preferably, such substrates have random fiber orientation. The support substrates may have grades of separating ability, in which a pore size of between 0.5 to 100 $\mu$m is typical, preferably between 1 and 50 $\mu$m. For an increase in the flux of the filter, it is advantageous if the support substrate exhibits a pore size gradient, that is, where the pore sizes either increase or decrease from the feed to the permeate side of the membrane. It is particularly advantageous to use support sheets wherein the pore sizes diminish as the edge areas are approached, which areas are fluid-tight potted in the anchoring element or end cap. In this way, one achieves an increased degree of protection for the hydrophilic membrane in its edge area and reduces to a minimum the loss of flux of the filtration unit caused by the presence of the support substrate.

If one selects as a measure for the porosity of the core sheet the standard of DIN 53 887 calling for air permeability measured at a pressure difference of 0.5 bar, then core sheets with an air permeability of 150 to 4000 $dm^3/sm^2$ are preferred. Particularly preferred is an air permeability between 600 and 1500 $dm^3/sm^2$.

The defined surface weight, in accord with the German Standard Industrial Norm, is between 20 and 120 $g/m^2$, preferably from 30 to 80 $g/m^2$. DIN 53 855/1 specifies that thickness should be between about 0.05 and 0.60 mm.

The support substrates are comprised of polymer fibers with the sheets typically having pore diameters in a range between about 10 and 50 $\mu$m. The presence of fibers in the support sheets contributes to excellent mechanical stability in the bond between the membrane and the support. Especially good results are obtained with a non-woven cloth or fleece comprised of composite fibers or filaments that have a higher melting point polymeric core surrounded or clad by a lower melting point polymer sheath. A preferred form of such core-clad type non-woven cloth has fibers with the following make-up: polypropylene (PP) core, particularly with a melting point of about 150° C.±10° C., and polyethylene (PE) sheath surrounding the PP core, the PE having a melting point in the area of 135° C.±5° C., 120° C.±5° C. or 105° C.±5° C. The PP core, of higher melting point, restricts the loss of the melting PE sheath material and so facilitates the permeation of the fluid PE into the hydrophilic membrane by capillary action in the interface between the edge areas of the hydrophilic membrane and the end caps. The weight ratio of the polymers PP:PE in this type of preferred non-woven support may vary between 2:98 and 90:10, a ratio of 50:50 being preferred. The use of pure PE leads to a lack of stability, but can be compensated for by use of an increased surface weight of the PE support sheet.

The hydrophilic porous membranes are preferably selected from polysulfones (PS), polyethersulfones (PES) and polyamides (PA), although any of the known conventional hydrophilic polymers may be used. The membranes have pore sizes between about 0.05 and 10 $\mu$m, between 0.1 and 1.2 $\mu$m being preferred. Particularly preferred is a range between 0.1 and 0.65 $\mu$m.

The invention is applicable to all hydrophilic filtration units wherein the porous membranes are potted with thermoplastic polymer material into anchoring elements or end caps in their edge areas. Examples include filter element containing filtration units such as filter modules or cartridges, with flat filter elements, hollow fiber modules, and disposable and tubular modules with tube-shaped filter elements.

Anchoring elements are filtration module components, which together with the potted membrane, separate the filtration unit into a filtrate and fluid feed in such a way that the fluid feed can proceed from the pre-filter side to the filtrate side only by passage through the membrane. Such components are typically end caps of filter modules or housing sections of disposable filters. The anchoring elements are typically thermoplastic polymers, preferably polyolefins, such as polyethylene and polypropylene. They often include polysulfones and polyamides. They are so composed, that the potting of the porous membrane takes place through heating which melts the thermoplastic polymers. The melt may also derive from a thermoplastic material additive, such as polyolefins, halogentated polyolefins, polysulfones, polyethersulfones or polyamides.

To determine the presence of edge hydrophobic characteristics, a series of pleated filter modules with membranes having pore diameters of 0.2 $\mu$m and a membrane surface area of 0.7 $m^2$ were made up, wetted with deionized water, and a test was run for diffusion at a differential pressure of 2.5 bar with air as the test gas. Filter modules exhibiting a diffusion threshold of $\geq$10 ml/min were deemed to establish the limit showing the presence of hydrophobicity. As a control, similar filter modules with membranes film-coated on their edges were made, which were known to have no edge hydrophobic characteristics. Under the same test conditions, such modules exhibited diffusion values of <14 ml/min. Study of those filter modules displaying edge hydrophobic characteristics showed, in accord with the Bacteria Challenge Test, that the elevated diffusion values were not due to membrane defects. Evaluations from SEM photographs confirmed this finding. Samples of clippings from the potted area of the composite were taken and smoke tests were al so run on the module filters showing edge hydrophobic characteristics to confirm the lack of membrane defects. All of these procedures and tests were used in the following Examples to determine the presence or absence of edge hydrophobicity characteristics in the porous filtration membranes and the results are summarized in Table 1.

EXAMPLE 1

Figure 2:
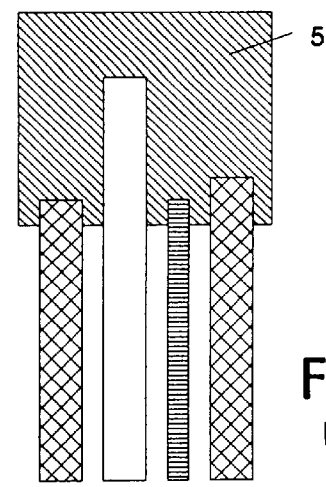
FIG. 2 is a schematic of the assembly shown in FIG. 1 following sealing in the anchoring element or end cap of a module.

A series of hydrophilic membrane filter modules of the type shown in FIG. 1 were prepared, wherein the hydrophilic membrane 2, the support substrate 1 in the form of a non-woven cloth or fleece of fibers having a PP core clad in a PE sheath and the permeation- and flux-enhancing spacer sheets 3 and 4 were neither bonded by laminating procedure nor physically/chemically bonded. In all, 50 such composites were made from PA membranes, and 100 from PES. In this way, the potting shown in FIG. 2 of the individual layers of the composite filter element was carried out with each layer being independent of the others. Filtration tests showed that there was neither protection of the hydrophilic membrane 2 by the dissipation of heat from the membrane 2 during the melting of the thermoplastic fleece, nor did the melted thermoplastic fleece, by means of capillary or adhesive forces, seal the membrane's damaged areas in the peripheral edge areas immediately adjacent the anchoring element. In all filtration elements so constructed, edge hydrophobicity in the area of the anchoring element was found to be present.

EXAMPLE 2

Figure 3:
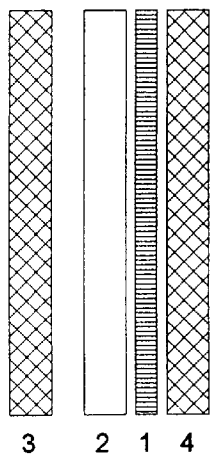
FIG. 3 is a schematic of an assembly of a support sheet with a hydrophilic, porous membrane and a sheet of spacer matting to facilitate membrane permeation and enhance flux with physical/chemical bonding before potting in an anchoring element or end cap.
Figure 4:
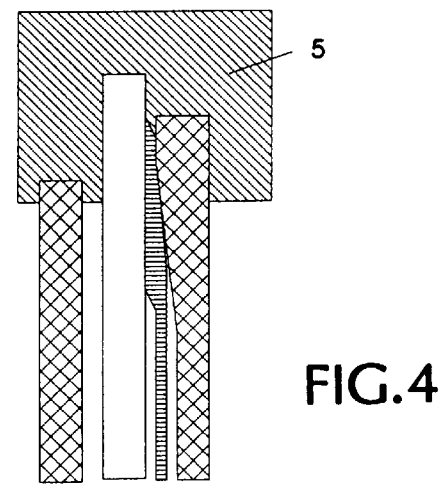
FIG. 4 is a schematic of the assembly of FIG. 3 following potting in an anchoring element or end cap.

A series (50 PA, 50 PES) of hydrophilic membrane filtration modules of the type described in Example 1 were prepared except that elements 1,2 and 4 were bound together during pleating, as schematically portrayed in FIG. 3. Subsequently, the potting of the individual layers took place in the anchoring material 5, as schematically shown in FIG. 4. Tests of the type mentioned above showed that the hydrophilic membrane was protected in its peripheral or edge areas and that the thermoplastic melt, by capillary and/or adhesion forces, sealed the damaged edge areas in the vicinity of anchoring element 5.

EXAMPLE 3

Figure 5:
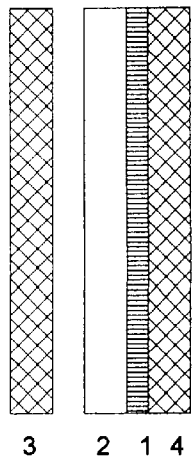
FIG. 5 is a schematic of an assembly support sheet with a hydrophilic porous membrane and a further mat/fabric made by laminating and a sheet of spacer matting to facilitate membrane permeation and enhance flux before potting in an anchoring element or end cap.
Figure 6:
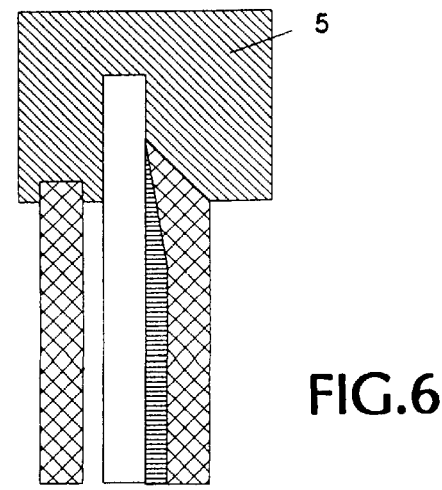
FIG. 6 is a schematic of the assembly of FIG. 5 following potting.

A series of (50 PA, 180 PES) of hydrophilic membrane filtration modules were prepared having substantially the same construction as in Example 2, except that elements 1, 2 and 4 were bound together by lamination, then potted as schematically shown in FIGS. 5–6. Even better results were obtained than in Example 2 with respect to prevention of edge hydrophobicity.

EXAMPLE 4

Figure 7:
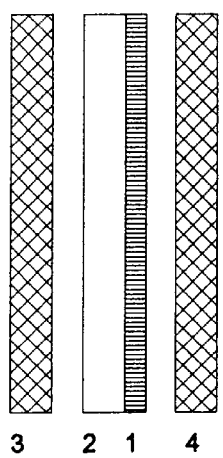
FIG. 7 is a schematic of an assembly resulting from laminating a support sheet with a hydrophilic porous membrane and with a sheet of spacer mats/fabrics to facilitate permeation and enhance flux through the membrane before potting in an anchoring element or end cap.
Figure 8:
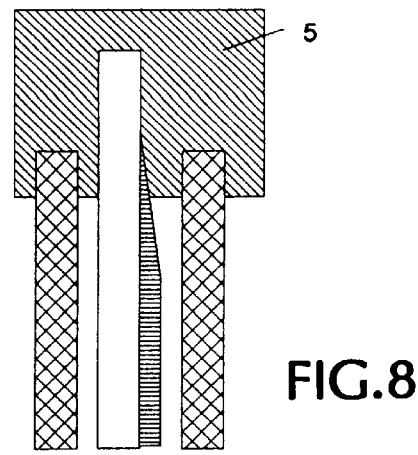
FIG. 8 is a schematic of the assembly of FIG. 7 following potting.

A series (60 PA, 80 PES) of hydrophilic membrane filtration modules were prepared wherein membrane 2 and the support sheet 1 in the form of a non-woven cloth of fibers having a PP/PE core/sheath were bonded to one another by a lamination procedure, as schematically depicted in FIG. 7, then potted in anchoring element 5 as shown in FIG. 8. The effect was virtually identical to that obtained in Example 3—without the additional support of a spacer sheet 3 or 4. In the case of 140 filtration elements constructed in this way, only one case of edge hydrophobicity was detected in the vicinity of the anchoring element.

EXAMPLE 5

Figure 9:
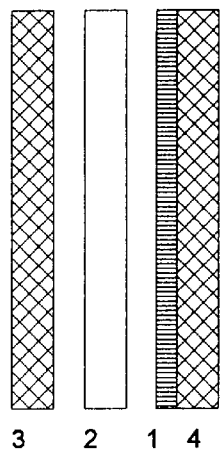
FIG. 9 is a schematic of an assembly of a laminated support sheet with a spacer matting and with a porous membrane without physical/chemical bonding before embedment in an anchoring element or end cap.
Figure 10:
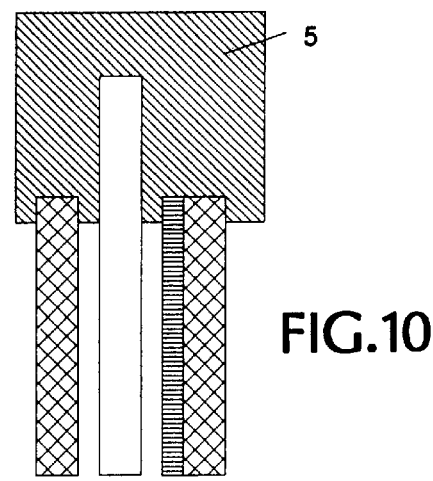
FIG. 10 is a schematic of the composite of FIG. 9 after potting.

Fifty PA hydrophilic membrane filtration modules were prepared with bonding only between elements 1 and 4, shown in FIG. 9, then potted as shown in FIG. 10. The results in terms of edge hydrophobicity were identical to those obtained in Example 1—none retained their hydrophilicity.

EXAMPLE 6

Figure 11:
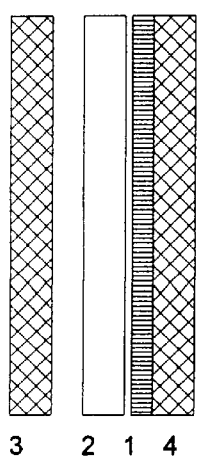
FIG. 11 is a schematic of an assembly of a support with a sheet of spacer matting to facilitate permeation and enhance flux with a porous hydrophilic membrane laminated together with physical/chemical bonding before potting in an anchoring element or end cap.
Figure 12:
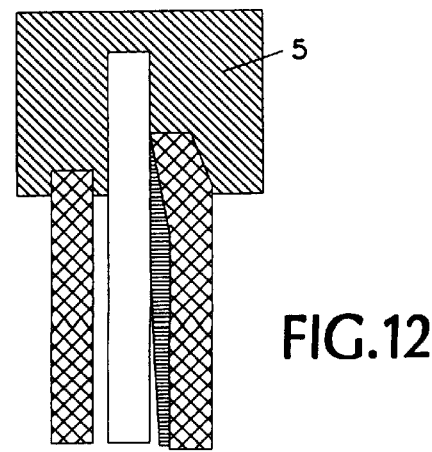
FIG. 12 is a schematic of the assembly of FIG. 11 after potting.

Thirty PA hydrophilic membrane modules were prepared as in Example 2, (see FIGS. 11–12) with substantially the same results. As seen from Table 1, edge hydrophobicity was detected in the area of the anchoring element 5 in only 4 cases.

EXAMPLE 7

Figure 13:
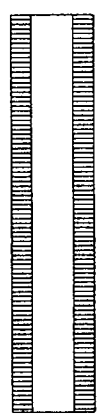
FIG. 13 is a schematic of an assembly of a hydrophilic porous membrane laminated on both sides with support sheets before potting in an anchoring element or end cap.
Figure 14:
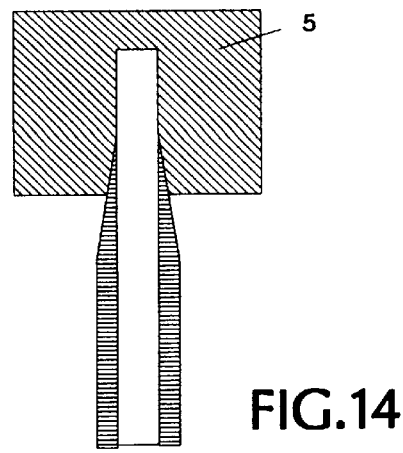
FIG. 14 is a schematic of the assembly of FIG. 13 after potting.

A series (20 PA, 30 PES) of hydrophilic membrane filtration modules were fabricated by "sandwiching" membrane 2 between two core-clad PP/PE fiber-type non-woven sheets 1 and 6, then laminating the three components together, as shown in FIG. 13, then bonded in the anchoring element 5 as a composite, as shown in FIG. 14. Edge hydrophobicity was detected in only one of the filtration elements so fabricated.

EXAMPLE 8

Figure 15:
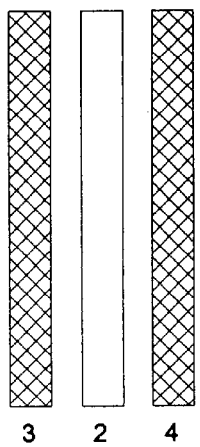
FIG. 15 is a schematic presentation of an assembly of a hydrophilic, porous membrane between sheets of spacer matting on a polypropylene support before potting in an anchoring element or end cap.
Figure 16:
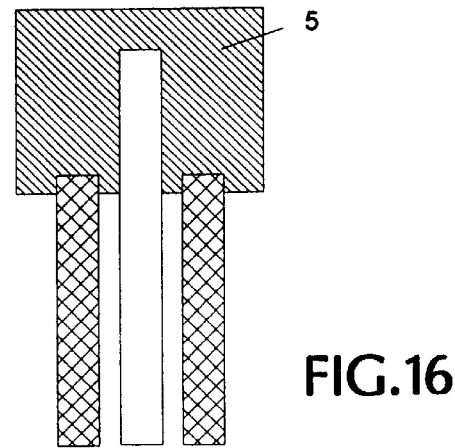
FIG. 16 is a schematic of the assembly of FIG. 15 after potting.

Two hundred hydrophilic membrane filtration modules (100 PA, 100 PES) were prepared with no lamination or bonding between the membranes and PP support sheets on each side, shown in FIG. 15, then potted in anchoring element 5, shown in FIG. 16. The effect was identical to that of Example 1 in that all filtration elements displayed edge hydrophobicity.

EXAMPLE 9

Figure 17:
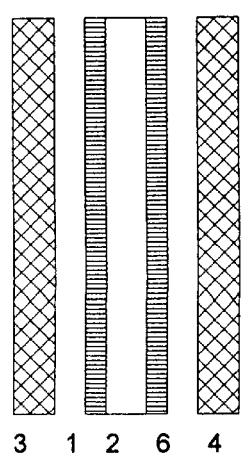
FIG. 17 is a schematic of an assembly of a hydrophilic porous membrane with lamination on both sides, with support sheets and the incorporation of sheets of flux- and permeation-enhancing spacer matting before potting in an anchoring element or end cap.
Figure 18:
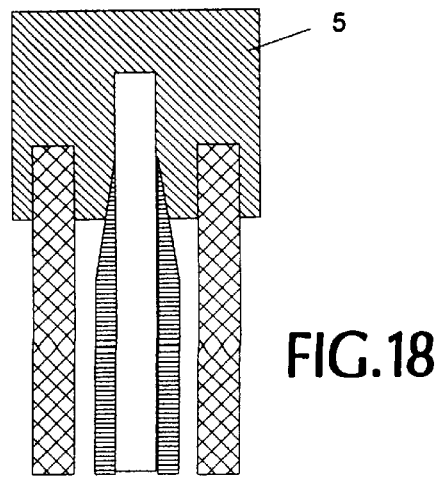
FIG. 18 is a schematic of the assembly in accord with FIG. 17 after potting.

Forty PA hydrophilic membrane composite filtration modules were prepared as in Example 7 with the additional employment of permeation- and flux-enhancing spacer mats on either side of the laminate, as shown in FIGS. 17 and 18. None of the filtration elements displayed edge hydrophobicity.

EXAMPLE 10

Figure 19:
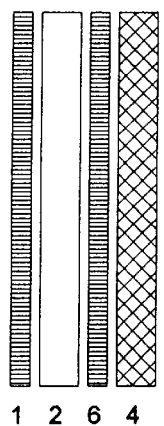
FIG. 19 is a schematic of an assembly of a support sheet with the porous membrane having two-sided physical/chemical bonding before potting in an anchoring element or end cap.
Figure 20:
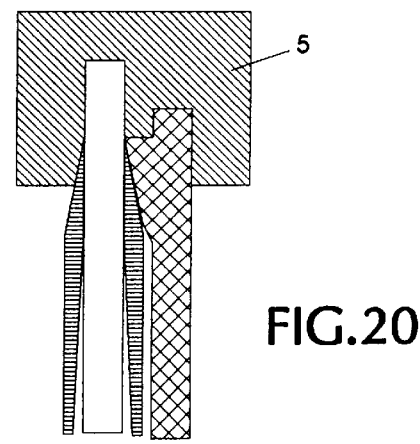
FIG. 20 is a schematic of the assembly of FIG. 19 after potting.

Forty PES hydrophilic membrane composite filtration modules were fabricated by bonding PE support mats 1 and 6 on both sides of the membrane 2, as shown in FIG. 19, then potted in anchoring element 5, shown in FIG. 20. All the so-fabricated filtration elements retained their hydrophilic nature in the edge areas.

EXAMPLE 11

Figure 21:
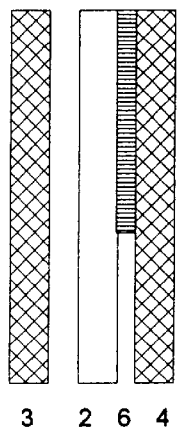
FIG. 21 is a schematic of an assembly resulting from lamination of a support sheet exclusively in the edge area of the porous membrane before potting in an anchoring element or end cap.
Figure 22:
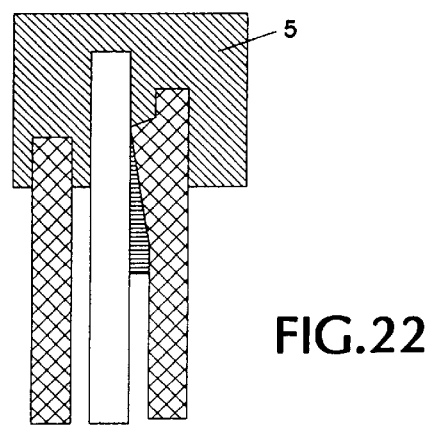
FIG. 22 is a schematic of the assembly of FIG. 21 after potting.

Seventy (50 PA, 20 PES) hydrophilic membrane composite filtration modules were fabricated as schematically shown in FIG. 21, by laminating a PE support sheet 6 between the membrane 2 and a permeation- and flux-enhancing spacer sheet in the edge area of the membrane only, then potted in anchoring element 5, as shown in FIG. 22. All but one of the so-fabricated filtration elements retained its hydrophilic nature in their edge areas.

TABLE 1

| Construction Type | Number of Filtration Elements | Number of Elements Without Edge Hydrophobicity |
|---|---|---|
| Example 1 | PA:50 | PA:0 |
|  | PES:100 | PES:0 |
| Example 2 | PA:50 | PA:33 |
|  | PES:50 | PES:29 |
| Example 3 | PA:50 | PA:50 |
|  | PES:180 | PES:178 |
| Example 4 | PA:60 | PA:59 |
|  | PES:80 | PES:80 |
| Example 5 | PA:50 | PA:0 |
| Example 6 | PA:30 | PA:26 |
| Example 7 | PA:20 | PA:19 |
|  | PES:30 | PES:30 |
| Example 8 | PA:100 | PA:0 |
|  | PES:100 | PES:0 |
| Example 9 | PA:40 | PA:40 |
| Example 10 | PES:40 | PES:40 |
| Example 11 | PA:50 | PA:49 |
|  | PES:20 | PES:20 |

EXAMPLE 12

Three types of pleated 10" dead-end filter cartridges were fabricated. Types 1 and 2 were prepared using a non-woven support of the type used in Example 1, wherein there was 50 wt % of each of PP and PE. The hydrophilic membrane used in all three types of cartridges was a polyamide-6 (nylon) membrane having 0.2 μm pores, a bubble point of 3.2 bar and a membrane surface area of 0.7 m².

In the case of Type 1, in accordance with the invention, the membrane and the non-woven support sheet were laminated together by flame bonding prior to pleating. In the case of Type 2, the membrane and the non-woven support sheet were pleated separately, and then united into a combination pleated element, so that no bonding existed between the membrane and the support fleece. Type 3 was a nylon-reinforced polyamide membrane prepared as in commonly assigned U.S. Pat. No. 5,227,070.

All three types were tested for their flux at three different pressure differentials as reported in Table 2. The same Table of data also shows the water flux % at 20° C. in L/min, with the flux of Type 2 being taken as 100%. The measured values were averaged from five measurements on five cartridges of the same type.

TABLE 2

| Type | Flux at Δp = 0.1 bar [L/min] | % | Flux at Δp = 0.3 bar [L/min] | % | Flux at Δp = 0.5 bar [L/min] | % |
|---|---|---|---|---|---|---|
| Type 1 | 6.1 | 96.8 | 18.1 | 97.3 | 28.8 | 92.6 |
| Type 2 | 6.3 | 100 | 18.6 | 100 | 31.1 | 100 |
| Type 3 | 4.6 | 73 | 13.2 | 71 | 23.2 | 74.6 |

As is apparent from Table 2, relatively high fluxes were obtained with the Type 1 filter cartridges fabricated in accordance with the invention. The filter cartridges of Type 2, because of their edge hydrophobicity, were not testable for integrity. As to the filter cartridges of Type 3, the fluxes declined to a value of between 74.6% and 71%.

A further advantage of filtration units made in accordance with the present invention is that they are imbued with mechanical stability relative to filtration units utilizing Type 2 cartridges, which represent the present state of the technology. This increased mechanical stability translates to an increase in burst pressure of some 3 bar. The burst pressure of non-laminated PES membranes lies at about 0.5 bar. To demonstrate this effect, a number of Type 1 filter cartridges were prepared as noted above, but substituting PES membranes for the polyamide-6 membranes and exposed to pulsed flow wherein the pulses had a pressure differential of 6 bar. After 6000 pulsations, no damage to the membranes was observed. After twenty 20-minute cycles of steam sterilization at 2 bar and 134° C. no change in the flux of the filter cartridges was detected.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A filtration module comprising a porous, entirely hydrophilic membrane sealed along its periphery by embedment in a thermoplastic resin and at least one porous thermoplastic polymeric substrate bonded to said membrane at least along said periphery and on at least one side of said membrane, whereby said filtration module is made by the process of the following, steps:

(a) bonding said porous hydrophilic membrane at least along its said periphery and on its said at least one side to said at least one substrate, and (b) embedding said membrane in said thermoplastic resin, wherein step (a) precedes step (b) such that said hydrophilic membrane retains its hydrophilic nature.

2. The module of claim 1 wherein the bonding between said porous hydrophilic membrane and said at least one porous substrate is effected by the application of heat and pressure.

3. The module of claim 1 wherein the bonding between said porous hydrophilic membrane and said at least one porous substrate is effected by the application of flame bonding.

4. The module of claim 1 wherein said thermoplastic polymeric fibers are randomly oriented in said at least one porous substrate.

5. The module of claim 1 wherein the form of said at least one porous substrate is selected from a mat, a fleece, a fabric and netting.

6. The module of claim 1 wherein said membrane is bonded to two porous substrates between said two porous substrates.

7. The module of claim 1 wherein said at least one porous substrate comprises a core polymer clad by a sheath polymer, and said sheath polymer has a lower melting point than said core polymer.

8. The module of claim 7 wherein said core polymer is polypropylene and said sheath polymer is polyethylene.

9. The module of claim 1 wherein said porous hydrophilic membrane comprises a polymer selected from the group consisting of polyamides, polysulfones and polyethersulfones.

10. The module of claim 1 wherein said porous hydrophilic membrane is embedded alone its periphery in anchoring elements.

11. The module of claim 10 wherein said anchoring elements are part of a housing for said module.

12. The module of claim 11 wherein anchoring elements are end caps.

13. The module of claim 1 wherein the form of said porous hydrophilic membrane is selected from the group consisting of tubular, pleated flat and hollow fiber.

14. The module of claim 1 wherein said thermoplastic resin is selected from the group consisting of polyamides, polyolefins, polysulfones and polyethersulfones.

15. The module of claim 1 wherein said thermoplastic resin is polypropylene.

* * * * *

UNITED STATES PATENT AND TRADEMARK OFFICE
CERTIFICATE OF CORRECTION

PATENT NO. : 6,186,341 B1
DATED : February 13, 2001
INVENTOR(S) : Konstantin, et al It is certified that error appears in the above-identified patent and that said Letters Patent is hereby corrected as shown below:

<u>Title page,</u>
Under item [30], "Foreign Application Priority Data" insert the following:
-- Nov. 20, 1996 (PCT)....... EP 96/05105 --

Signed and Sealed this

Thirtieth Day of October, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.   : 6,186,341 B1  
DATED        : February 13, 2001  
INVENTOR(S)  : Konstantin et al.

It is certified that error appears in the above-identified patent and that said Letters Patent is hereby corrected as shown below:

<u>Column 1,</u>
Line 67, change "patient:" to read -- patient. --

<u>Column 2,</u>
Line 55, change "resin-of" to read -- resin of --

<u>Column 6,</u>
Line 53, change "tests were al so run" to read -- tests were also run --

<u>Column 8, example 8,</u>
Lines 24-31, correct the skewed spacing in the paragraph Signed and Sealed this Thirteenth Day of November, 2001

*Attest:*

*Nicholas P. Godici*

*Attesting Officer*

NICHOLAS P. GODICI
*Acting Director of the United States Patent and Trademark Office*